Nov. 10, 1959     D. E. GOMMEL     2,912,021
MOUNTING ROTORS ON ARBORS OF VARIOUS TRANSAXIAL CONTOURS
Filed March 10, 1958
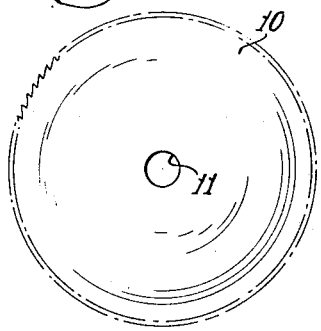
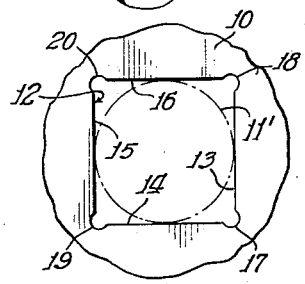
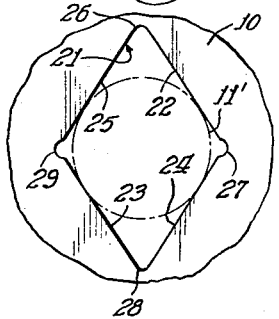
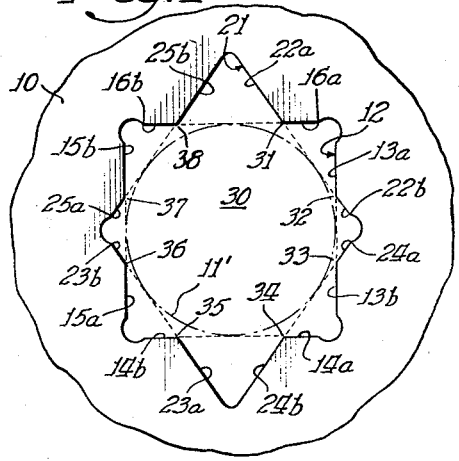
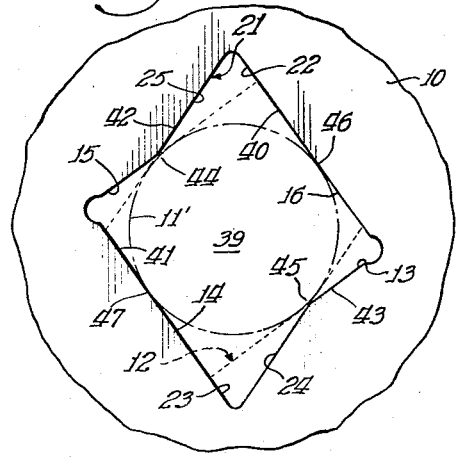
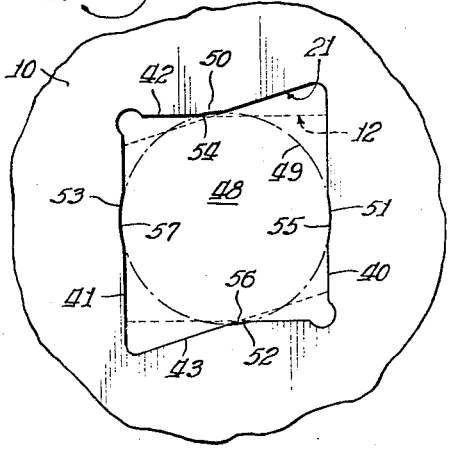
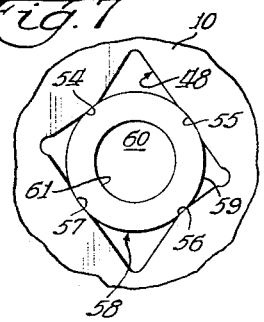
Inventor:
Dewey E. Gommel
By Frank C. Parker Atty.

United States Patent Office 2,912,021
Patented Nov. 10, 1959

2,912,021

MOUNTING ROTORS ON ARBORS OF VARIOUS TRANSAXIAL CONTOURS

Dewey E. Gommel, Indianapolis, Ind., assignor to Borg-Warner Corporation, Chicago, Ill., a corporation of Illinois Application March 10, 1958, Serial No. 720,251

4 Claims. (Cl. 143—155)

This invention relates to a means for mounting rotary tools on arbors of various transaxial contours.

It is well-known that there are many different power driven machines manufactured today having arbors or output shafts on which various separate rotary tools are intended to be selectively mounted. One such rotary tool is a circular saw blade which is provided with a central eye means therein whereby the rotary tool is adapted to be telescopically mounted on an arbor of a power driven machine. Each machine, of course, is adapted to drive many different types of rotary tools. The arbors of the various power driven machines that are on the market today have varied in cross sectional size and have been formed with either circular, square or rhombic cross sectional configurations. Because the rotary tool machines have been made with the aforementioned difference in the arbors thereof, rotary tool manufacturers have been attempting to provide rotary tools with universal eye means that would permit the rotary tool to be appropriately mounted on arbors of different cross sectional configurations and sizes. It is known that there are two power driven machines on the market today, one of which has a standard size rhombic cross sectional arbor and the other having a standard size square cross sectional arbor where the perpendicular distance between the opposed parallel sides of the rhombic arbor is substantially equal to the length of the side of the square arbor. It has also been found that theer is a rotary tool machine that has a circular cross sectional arbor, the diameter of which is substantially equal to the length of the side of the previously mentioned standard size square shaped arbor. A universal eye means has been designed for rotary tools whereby the rotary tool is adapted to be selectively mounted on the standard size square, round and rhombic cross sectional arbors mentioned above. Such a universal eye means is fully disclosed in the United States patent to Gommel, No. 2,649,868.

It has been found, however, that there are many power tool machines produced today having arbors of circular and square cross sectional configuration which vary in size from the previously mentioned standard size circular and square shaped arbors. It has further been found that a rotary tool having an eye means formed therein in accordance with the teaching of the afore-mentioned patent is not adapted to be accurately or positively mounted on the selected circular-shaped arbor as there is transaxial movement between the rotary tool and the round arbor.

It is, therefore, a primary object of this invention to provide a universal eye means in a rotary tool whereby the rotary tool is adapted to be selectively mounted on arbors having a particularly sized circular, square or rhombic cross sectional configuration in such a manner that the rotary tool is prevented from transaxial movement relative to the particular arbor on which the rotary tool is mounted.

It is another object of this invention to provide an eye means in a rotary tool whereby the edge of the rotary tool defining the eye means therein is adapted to have portions thereof positively engage correspondingly shaped portions of the outer peripheral surface of either a particularly sized round, square or rhombic cross sectional arbor in such a manner that the rotary tool is prevented from transaxial movement relative to the particular arbor on which the rotary tool is mounted.

It is a further object of this invention to provide an eye means in a rotary tool as set forth in the preceding objects which is also adapted to receive a bushing therein having a central eye means formed therein so that the rotary tool may be mounted on an arbor having a cross sectional configuration smaller than at least one of the standard sized round, square or rhombic cross sectionally shaped arbors that are cooperable with the eye means formed in the rotary tool.

Other and more particular objects, uses and advantages of this invention will become apparent from a reading of the following detailed specification taken in connection with the accompanying drawing forming a part thereof and wherein:

Figure 1 is a side view of a conventional rotary tool such as a circular saw blade having a circular eye means formed therein.

Figure 2 is a fragmentary side view of a rotary tool having a square eye means formed therein.

Figure 3 is a similar fragmentary view showing a rhombic shaped eye means formed in a rotary tool.

Figure 4 is a similar view illustrating a combination eye means whereby the rotary tool is adapted to be mounted on either a standard size square or rhombic shaped arbor.

Figure 5 is another similar view showing a prior known combination eye means formed in a rotary tool whereby the rotary tool is adapted to be selectively mounted on standard size round, square and rhombic cross sectional arbors.

Figure 6 is a side view of a rotary tool having an eye means formed therein in accordance with this invention whereby the rotary tool is adapted to be selectively mounted on arbors of circular, square and rhombic cross sections.

Figure 7 illustrates a rotary tool having an eye means formed therein in accordance with this invention and having a bushing means received in the eye means thereof in order that the rotary tool may be mounted on a smaller sized circular cross sectional arbor by means of a central eye means formed in the bushing.

Figure 8 illustrates a bushing similar to the bushing illustrated in Figure 7 except that the eye means formed there in adapted to receive an arbor having a square cross sectional configuration.

Reference is now made to the drawing wherein like reference numerals are used throughout to designate like parts and wherein Figure 1 illustrates a conventional form of a circular saw blade 10 provided with a concentric circular eye means 11. This blade 10, of course is only adapted to be mounted on an arbor having a circular cross section. For purposes of illustration only, the fragmentary views of the rotary tools 10 illustrated in Figures 1–7 have been referred to as circular saw blades. However, it should be understood that any type of rotary tool may be used, the feature being deemed essential to this invention is the particular eye means formed therein.

The rotary tool 10 illustrated in Figure 2 is provided with a standard size square eye means 12 defined by four equal length sides or edges 13, 14, 15, and 16. The side 13 joins the adjacent sides 14 and 16 at points 17 and 18 respectively. Similarly the side 15 joins the adjacent sides 14 and 16 at points 19 and 20 respectively. As illustrated, the square eye means 12 is adapted to circumscribe a circle 11' disposed concentric therewith and shown in dotted form. The perpendicular distance between each pair of opposed sides, 13—15 or 14—16, is equal to the diameter of the circumscribed circle 11'. It should be noted that each of the sides 13—16 of the square eye means 12 are disposed tangential to the circle 11'. The rotary tool illustrated in Figure 2 is adapted to be mounted on either a square cross sectional arbor corresponding in size to the square eye means 12 or on a round cross sectional arbor having a diameter corresponding in size to the diameter of the circle 11'. When the rotary tool 10 is mounted on the round arbor each of the sides 13—16 of the eye means 12 engage the outer peripheral surface of the round arbor at the perpendicular bisector thereof.

Figure 3 illustrates a fragmentary side view of a rotary tool 10 formed with a rhombic eye means 21 whereby the rotary tool 10 is adapted to be mounted on standard size arbors having either a rhombic or diamond shaped cross section or a round shaped cross section. The rhombic eye means 21 is defined by a first pair of parallel sides 22 and 23 and a second pair of parallel sides 24 and 25. The side 22 joins the adjacent sides 21 and 24 at points 26 and 27 respectively and the side 23 joins the adjacent sides 24 and 25 at points 28 and 29 respectively. The rhombic eye means 21 is so formed that it is adapted to circumscribe a concentrically disposed circle 11', which circle corresponds in size to the circumscribed circle 11' illustrated in Figure 2. In this manner each of the sides 22—25 are disposed tangential to the circumscribed circle 11'. When a round arbor, having a diameter equal to the diameter of the circle 11', is received in the eye means 21, each of the sides 22—25 engage the outer peripheral surface of the round arbor thereby preventing transaxial movement of the rotary tool 10 relative to the round arbor.

It can be seen that the rotary tool 10 illustrated in Figure 2 is adapted to be selectively mounted on certain sized square shaped arbors and on certain sized round shaped arbors. Similarly, the rotary tool 10 illustrated in Figure 3 is adapted to be selectively mounted on certain sized rhombic shaped arbors and on the same round shaped arbors that are also cooperable with the Figure 2 embodiment.

The rotary tool 10 illustrated in Figure 4 discloses a rotary tool having another prior known combination eye means 30 formed therein. The rotary tool 10, shown in Figure 4, is adapted to be selectively mounted on either a standard size rhombic arbor or a standard size square arbor which arbors are respectively adapted to mount the rotary tools illustrated in Figures 3 and 2. The eye means 30 is formed by superimposing the square eye means 12, illustrated in Figure 2, upon the rhombic eye means 21 illustrated in Figure 3. The square eye means 12 is so placed upon the rhombic eye means 21 that the diagonals of the rhombic eye 21 perpendicularly bisect the sides of the square eye 12. In this manner the perimeter of the eye means 30 is defined in part by an edge portion 22a of the rhomb 21 angularly intersecting an edge portion 16a of the square eye means 12 at a point 31. Similarly the remaining part of the perimeter of the eye means 30 is defined clockwise by edge portions 22b, 24a, 24b, 23a, 23b, 25a, and 25b of the rhombic eye means 21 respectively angularly joining edge portions 13a, 13b, 14a, 14b, 15a, 15b and 16b of the square eye means 12 at points 32, 33, 34, 35, 36, 37, and 38 respectively. It should be noted that none of the edge portions of the eye means 30 engage the circumference of the concentrically disposed circle 11', the circle 11' being the same size as those illustrated in Figures 2 and 3. Therefore a rotary tool 10 having the eye means 30 formed therein is not adapted to be mounted on the particular round shaped arbor for which the eye means 12 and 21 are cooperable therewith. In order to provide a rotary tool that would be adapted to be selectively mounted on standard size square, rhombic, and round cross sectional arbors, a unique eye means must be formed therein. One such eye means is fully disclosed in the United States patent to Gommel, No. 2,649,868, issued August 25, 1953.

The universal eye means disclosed in the aforementioned patent is illustrated in Figure 5. The rotary tool 10 is provided with a universal eye means 39 in the following manner. The eye means 39 is formed by superimposing the square eye means 12, illustrated in Figure 2, upon the rhombic eye means 21, illustrated in Figure 3. The square eye means 12 is disposed concentrically with the rhombic eye means 21 in a manner similar to the eye means 30, illustrated in Figure 4, except that the square eye means 12 is rotated about the rhombic eye means 21 until a pair of opposed sides 14 and 16 thereof are superimposed upon and are rectilinear with the pair of opposed parallel sides 23 and 22 of the rhombic eye means 21. The perimeter of the eye means 39 thus formed is defined by a pair of opposed parallel rectilinear sides 40 and 41 and a pair of opposed irregularly shaped sides 42 and 43. The rectilinear side 40 is defined in part by the side 22 of the rhomb and in part by the side 16 of the square 12. Similarly the rectilinear side 41 is defined in part by the side 23 of the rhomb 21 and the side 14 of the square 12. The irregular side 42 is defined by a portion of the side 15 of the square 12 and a portion of the side 25 of the rhomb 21, each portion angularly intersecting one another at a point 44. The other irregular side 43 is similarly formed and comprises a portion of the side 13 of the square 12 and a portion of the side 24 of the rhomb 21, each portion angularly joining one another at a point 45. It can be seen that the eye means 39 is adapted to be concentric with and circumscribe the circle 11' in a manner whereby the opposite sides 40 and 41 of the eye means 39 are disposed tangential to the circle 11' at points 46 and 47 respectively. Although the intersecting points 44 and 45 of the irregular sides 42 and 43 respectively do not engage the circumference of the circle 11', it was thought that if a round arbor having a cross sectional diameter equal to the diameter of the circle 11', the diameter being in the order of 13/16 of an inch, the points 44 and 45 would only allow a play of 0.010" between the rotary tool 10 and the outside periphery of the round arbor disposed within the eye means 39.

It was found, however, that when a rotary tool had an eye means 39 formed therein in a manner as illustrated in Figure 5, the play between the points 44 and 45 of the rotary tool 10 and a round arbor received therein was sufficient to cause misalignment and other adverse conditions because the rotary tool was subject to transaxial movement relative to the arbor. It was further found that although there appeared to be one basic standard size rhombic arbor on the power driven machines, there were many rotary tool machines having different sized round, and square arbors. This present invention, therefore, disclosed a universal eye means for rotary tools which will not only be adapted to receive a standard sized square and, standard sized rhombic arbor but also a standard sized round arbor whereby there is positive engagement between the perimeter of the eye means and the outer peripheral surface of the round arbor to prevent play therebetween. This eye means is illustrated in Figure 6 and will now be described.

The eye means 48 in the rotary tool 10 illustrated in Figure 6 is formed, in part, in substantially the same manner as the eye means 39 shown in Figure 5 by superimposing the square eye means 12 on the rhombic eye means 21. However, in addition a circle 49 is superimposed upon the eye means 39, the circle 49 being disposed concentric with the rhomb 21 and square 12 and having a diameter greater than the diameter of the previous described circle 11'. In this manner the circle 49 is adapted to have portions of its circumference trace an arc 50, 51, 52, and 53 respectively on each side 42, 40, 43, and 41 of the eye means 39. The pattern traced by the arcs 50—53 is then cut out from the tool 10 thereby providing arcuate edge portions 54, 55, 56, and 57 respectively in the sides 42, 40, 43, and 41 of the eye means 39. It can be seen that when the rotary tool 10 illustrated in Figure 6 is mounted on a round arbor, the round arbor having a diameter equal to the diameter of the circle 49, the arcuate edge portions 54—57 of the eye means 48 respectively engage the outer peripheral surface of that round arbor preventing any transaxial movement of the rotary tool 10 relative to the round arbor. The rotary tool 10 having an eye means 48 formed therein is adapted to receive selectively a standard size rhombic arbor, a standard size square arbor and a round arbor having a diameter substantially equal to the diameter of the circle 49 whereby portions of the perimeter of the eye means 48 are adapted to engage correspondingly shaped portions of the outer periphery of the selected arbor received therein.

It has been found that there are also many power driven machines having round and square shaped arbors where the arbors have a cross sectional size substantially smaller than the standard size round and square arbors particularly adapted for the eye means 48. Therefore, another feature of this invention is to provide means to be used in combination with the eye means 48 whereby the rotary tool 10 is adapted to be mounted on the smaller sized arbors.

As shown in Figure 7 the rotary tool 10 is formed with an eye means 48 in a manner similar to that previously described for Figure 6 and has a bushing means 58 disposed within the eye means 48 thereof. The bushing means 58 has a substantially circular outer peripheral surface 59 which is adapted to engage the arcuate edge portions 54—57 of the perimeter of the eye means 48. In this manner the bushing means 58 is carried by the rotary tool 10 and is prevented from transaxial movement relative to the rotary tool 10. A central eye means 60 is in turn formed in the bushing means 58 which is adapted to receive a smaller size arbor than that for which the eye means 48 is adapted to receive. As shown in Figure 7 the bushing means 58 is formed with a substantially circular eye means 61 which is disposed concentric with the tool 10 when the bushing means 58 is carried thereby. Therefore, the rotary tool 10 illustrated in Figure 7 is adapted to be mounted on a smaller sized round arbor than the round arbor for which the eye means 48 is particularly adapted to receive.

As shown in Figure 8 the bushing means 58 is provided with a square eye means 62. By substituting the bushing means 58 illustrated in Figure 8 for the bushing means 58 shown in Figure 7 the rotary tool 10 will then be adapted to be mounted on a smaller sized square arbor than that for which the eye means 48 is adapted to receive.

It should be understood that the round bushing means 58 could be provided with any size eye means or combination of eye means thereof, the controlling feature thereof being the diameter defining the outer circumferential edge 59 whereby the bushing means 58 is adapted to be carried by the rotary tool 10 and have the edge 59 thereof engage each arcuate portion 54—57 of the eye means 48. It should also be understood that, if desired, the outer peripheral configuration of the bushing means 58 could conform to one other than circular so long as the bushing means 58 when disposed within the eye means 48 would be prevented from transaxial movement relative to the rotary tool 10.

While this invention has been disclosed in connection with certain specific embodiments thereof, it is to be understood that these are by way of example rather than limitation, and it is intended that the invention be defined by the appended claims, which should be given a scope as broad as the prior art.

What is claimed is:

1. In combination, a rotary tool adapted for mounting selectively on arbors of a predetermined round, square or rhombic cross-sectional size, said tool having a central eye means defined by a plurality of spaced arcuate portions having opposed ends, each of said arcuate portions being superimposed upon a circumference of a circle concentric with said tool, and by a plurality of edge portions each respectively joining adjacent ends of adjacent arcuate portions, each of said edge portions alternately being superimposed upon adjacent sides of a rhomb concentric with said tool and upon adjacent sides of a square concentric with said tool whereby any one of said arbors is adapted to be received in said central eye means to thereby mount said tool on that particular arbor, and a bushing means disposed in said central eye means and engaging said arcuate portions thereof, said bushing means having a second central eye means formed therein adapted to receive an arbor means having a smaller cross-sectional size than at least one of said arbors whereby said rotary tool is adapted to be mounted on said arbor means when said bushing means is disposed in said central eye means.

2. In combination, a rotary tool adapted for mounting selectively on arbors of a predetermined round, square or rhombic cross-sectional size, said tool having a central eye means defined by four spaced arcuate portions having opposed ends, each of said arcuate portions being superimposed upon a circumference of a circle concentric with said tool, and by four edge portions each respectively joining adjacent ends of adjacent arcuate portions, each of said edge portions alternately being superimposed upon adjacent sides of a rhomb concentric with said tool and upon adjacent sides of a square having opposite sides thereof superimposed on opposite parallel sides of said rhomb whereby any one of said arbors is adapted to be received in said central eye means to thereby mount said rotary tool on that particular arbor, and a bushing means disposed in said central eye means and engaging said arcuate portion thereof, said bushing means having a second central eye means formed therein adapted to receive an arbor means having a smaller cross-sectional size than at least one of said arbors whereby said rotary tool is adapted to be mounted on said arbor means when said bushing means is disposed in said central eye means.

3. In combination, a rotary tool adapted for mounting selectively on arbors of a predetermined round, square or rhombic cross-sectional size, said tool having a central eye means defined by four spaced arcuate portions having opposed ends, each of said arcuate portions being superimposed upon a circumference of a circle concentric with said tool, and by four edge portions each respectively joining adjacent ends of adjacent arcuate portions, each of said edge portions alternately being superimposed upon adjacent sides of a rhomb concentric with said tool and upon adjacent sides of a square having opposite sides thereof superimposed on opposite parallel sides of said rhomb whereby any one of said arbors is adapted to be received in said central eye means to thereby mount said rotary tool on that particular arbor, and a bushing means disposed in said central eye means and engaging said arcuate portions thereof, said bushing means having a substantially circular eye formed therein adapted to receive a substantially round arbor means having a smaller cross-sectional size than said round arbor whereby said rotary tool is adapted to be mounted on said round arbor means when said bushing means is disposed in said central eye means.

4. In combination, a rotary tool adapted for mounting selectively on arbors of a predetermined round, square or rhombic cross-sectional size, said tool having a central eye means defined by four spaced arcuate portions having opposed ends, each of said arcuate portions being superimposed upon a circumference of a circle concentric with said tool, and by four edge portions each respectively joining adjacent ends of adjacent arcuate portions, each of said edge portions alternately being superimposed upon adjacent sides of a rhomb concentric with said tool and upon adjacent sides of a square having opposite sides thereof superimposed on opposite parallel sides of said rhomb whereby any one of said arbors is adapted to be received in said central eye means to thereby mount said rotary tool on that particular arbor, and a bushing means disposed in said central eye means and engaging said arcuate portions thereof, said bushing means having a substantially square eye formed therein adapted to receive a substantially square arbor means having a smaller cross-sectional size than said square arbor whereby said rotary tool is adapted to be mounted on said square arbor means when said bushing means is disposed in said central eye means.

References Cited in the file of this patent

UNITED STATES PATENTS

| | | |
|---|---|---|
| 147,364 | Brown | Feb. 10, 1874 |
| 2,572,042 | Martin | Oct. 23, 1951 |
| 2,600,459 | Adams | June 17, 1952 |
| 2,649,868 | Gommel | Aug. 25, 1953 |
| 2,822,648 | Metzger et al. | Feb. 11, 1958 |